(12) United States Patent
Rehn et al.

(10) Patent No.: US 11,853,955 B2
(45) Date of Patent: Dec. 26, 2023

(54) SYSTEMS AND COMPUTERIZED METHODS FOR REAL TIME SHIPMENT COORDINATION

(71) Applicant: Coupang Corp., Seoul (KR)

(72) Inventors: Erik Rehn, Seoul (KR); Himanshu Doshi, Seoul (KR); Young Shin Kang, Incheon (KR); Haitao Jiang, Seattle, WA (US); In Hye Hwang, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/211,052

(22) Filed: Mar. 24, 2021

(65) Prior Publication Data
US 2022/0309453 A1 Sep. 29, 2022

(51) Int. Cl.
*G06Q 10/0833* (2023.01)
*G06Q 30/0601* (2023.01)
(Continued)

(52) U.S. Cl.
CPC ...... *G06Q 10/0833* (2013.01); *G06Q 10/0837* (2013.01); *G06Q 10/0838* (2013.01); *G06Q 30/0637* (2013.01)

(58) Field of Classification Search
CPC ...... G06Q 10/10; G06Q 40/08; G06Q 20/102; G06Q 10/08345; G06Q 10/109;
(Continued)

(56) References Cited
U.S. PATENT DOCUMENTS 8,255,337 B1 * 8/2012 Bennett ............... G06Q 10/025
705/333
8,301,511 B2 10/2012 Shroff et al.
(Continued)

FOREIGN PATENT DOCUMENTS

KR 10-2018-0131022 A 12/2018
TW 201435771 A 9/2014

OTHER PUBLICATIONS

Robert J. Glushko et al.; "An XML Framework for Agent-based E-commerce"; Mar. 1999; ACM; vol. 42, No. 3; 106-114 (Year: 1999).*
(Continued)

*Primary Examiner* — Omar Zeroual
*Assistant Examiner* — Jorge G Del Toro-Ortega
(74) *Attorney, Agent, or Firm* — FINNEGAN, HENDERSON, FARABOW, GARRETT & DUNNER LLP

(57) ABSTRACT

The present disclosure provides a computerized method for package management, including: storing, in a data structure, information of a seller in association with a plurality of items sold by the seller; receiving an indication of a transaction, the transaction indication including an address of a customer and at least one item identifier corresponding to an item sold by the seller; converting the transaction indication into a shipment request by formatting the transaction indication according to a standardized format required by a shipper; generating a message containing the formatted shipment request; transmitting the message to the shipper in real time to initialize shipment of the item; and providing real time confirmation to the seller and the customer that shipment has been initialized.

16 Claims, 9 Drawing Sheets

(51) Int. Cl.
*G06Q 10/0837* (2023.01)
*G06Q 10/083* (2023.01)

(58) Field of Classification Search
CPC .... G06Q 30/04; G06Q 10/06; G06Q 10/0833; G06Q 50/28; G06Q 10/0831; G06Q 10/0834; G06Q 20/14; G06Q 30/02; G06Q 30/0241; G06Q 30/06; G06Q 50/01; G06Q 10/063; G06Q 10/067; G06Q 10/0838; G06Q 10/101; G06Q 20/00; G06Q 20/04; G06Q 20/10; G06Q 20/108; G06Q 30/0202; G06Q 30/0258; G06Q 30/0261; G06Q 30/0601; G06Q 30/0611; G06Q 30/08; G06Q 40/00; G06Q 40/02; G06Q 40/04; G06Q 40/06; G06Q 40/123; G06Q 10/00; G06Q 10/06314; G06Q 10/06315; G06Q 20/20; G06Q 20/202; G06Q 20/322; G06Q 20/3265; G06Q 20/3276; G06Q 20/363; G06Q 20/367; G06Q 30/0201; G06Q 30/0273; G06Q 30/0275; G06Q 30/0625; G06Q 30/0641; G06Q 50/10; G06Q 50/22; G06Q 50/32; G06Q 50/30; G06Q 2240/00; G06Q 10/02; G06Q 40/025; G06Q 30/0284; G06Q 20/3674; G06Q 3/06; G06Q 10/025; G06Q 10/047; G06Q 10/0631; G06Q 10/08; G06Q 10/083; G06Q 10/08355; G06Q 10/087; G06Q 20/12; G06Q 20/384; G06Q 20/387; G06Q 20/405; G06Q 30/0234; G06Q 30/0236; G06Q 30/0238; G06Q 30/0239; G06Q 30/0251; G06Q 30/0609; G06Q 30/0633; G06Q 30/0635; G06Q 30/0637; G06Q 50/265; G06Q 10/063114; G06Q 10/06312; G06Q 10/107; G06Q 10/1095; G06Q 10/20; G06Q 20/382; G06Q 20/385; G06Q 20/4016; G06Q 20/4097; G06Q 30/0208; G06Q 30/0257; G06Q 30/0267; G06Q 30/0629; G06Q 30/0645; G06Q 50/06

See application file for complete search history.

(56) References Cited

U.S. PATENT DOCUMENTS

| | | | |
|---|---|---|---|
| 9,692,738 B1 | 6/2017 | Wenneman et al. | |
| 10,248,987 B1 | 4/2019 | Chandra et al. | |
| 2005/0171862 A1* | 8/2005 | Duncan | G06Q 40/04 705/26.4 |
| 2006/0149577 A1* | 7/2006 | Stashluk, Jr. | G06Q 10/0837 705/340 |
| 2012/0066262 A1* | 3/2012 | Greenberg | G06Q 10/101 707/784 |
| 2015/0066752 A1* | 3/2015 | Phillips | G06Q 20/22 705/40 |
| 2017/0154302 A1* | 6/2017 | Streebin | G06T 7/521 |
| 2018/0025417 A1* | 1/2018 | Brathwaite | G06Q 10/0835 705/14.66 |
| 2020/0160428 A1* | 5/2020 | Calvo | G06Q 10/0834 |
| 2020/0279216 A1 | 9/2020 | Smith et al. | |
| 2020/0387957 A1 | 12/2020 | Koh | |
| 2021/0158254 A1* | 5/2021 | Feldman | G06Q 10/0637 |
| 2021/0256468 A1* | 8/2021 | Downing | H04L 51/046 |

OTHER PUBLICATIONS

PCT Notification of Transmittal of the International Search Report and the Written Opinion, including the International Search Report and the Written Opinion, in counterpart PCT Application No. PCT/IB2021/052949 dated Dec. 17, 2021. (11 pages).

Notice of Preliminary Rejection in counterpart Korean Application No. 10-2021-0149986 dated Oct. 25, 2022 (18 pages).

Office Action in counterpart Taiwanese Application No. 111108810 dated Jan. 4, 2023 (18 pages).

Rejection Decision in counterpart Taiwanese Application No. 111108810 dated May 25, 2023 (15 pages).

Notice of Final Rejection in counterpart Korean Application No. 10-2021-0149986 dated Mar. 20, 2023 (6 pages).

* cited by examiner

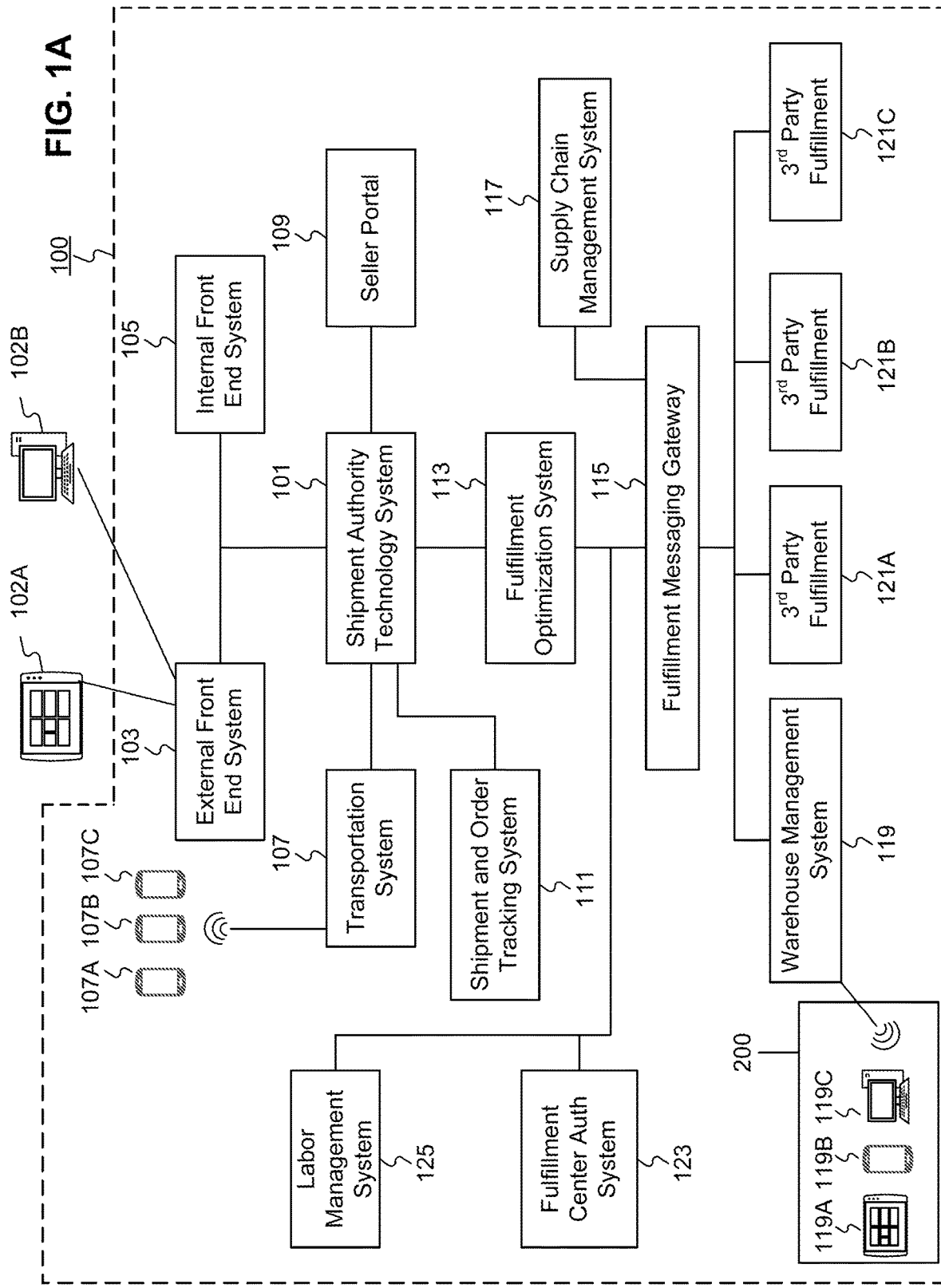

SYSTEMS AND COMPUTERIZED METHODS FOR REAL TIME SHIPMENT COORDINATION

TECHNICAL FIELD

The present disclosure generally relates to computerized systems and methods for real time shipment coordination. In particular, embodiments of the present disclosure relate to inventive and unconventional systems and methods utilized for an e-commerce site provider to coordinate shipments between third party sellers and customers using a courier service, allowing lower shipment costs and live shipment updates.

BACKGROUND

Modern e-commerce sites enable customers to access thousands of products in seconds. However, e-commerce companies are often limited in the number of items that they may offer due to warehouse size, order fulfillment complexity, and costs of maintaining large inventories and thousands of stock keeping units (SKUs). Thus, an e-commerce company may expand by allowing third parties, such as individuals or other companies, to sell items using the e-commerce website and fulfill orders from a third party location. This arrangement benefits the e-commerce company by reducing inventory costs. It also benefits third party sellers by providing access to a much larger customer base and website infrastructure. Further, this provides customers with a wider variety of goods than on traditional e-commerce sites.

However, third party seller arrangements add additional complexities that may increase cost and transaction difficulty. For example, when a customer makes a purchase from a third party seller on an e-commerce site, the third party seller may independently arrange packaging and shipment of goods to the customer. Since third party sellers are often smaller businesses than e-commerce sites, third party seller costs may not benefit from economies of scale available to the e-commerce site.

For instance, an e-commerce site may be able to bargain for a reduced cost of packaging supplies by buying boxes, tape, and filler in bulk. Similarly, e-commerce sites may bargain for reduced shipment costs, and contract with a courier service that provides lower shipping cost in exchange for higher shipping volume. These same savings, though, are often unavailable to smaller third party sellers.

Further still, when third party sellers independently arrange shipment, they are often unable to meet expectations of customers who are accustomed to the shipment experience provided by an e-commerce site. For example, an e-commerce site may provide a customer view with purchase history and tracking information for packages. Customers may then expect to see tracking information easily through the e-commerce site. However, because third party sellers arrange shipping independent of the e-commerce site, customers may be unable to view tracking information in the same manner as for orders fulfilled by the e-commerce site.

Accordingly, there is a need for improved methods and systems for computerized systems and methods that provide a consistent customer shipping experience for purchases from third parties and from an e-commerce site. With these systems and methods, third party sellers may benefit from reduced shipping costs, customers may benefit from improved shipment transparency, and e-commerce sites may benefit from even greater economies of scale and sales growth.

SUMMARY

One aspect of the present disclosure is directed to a computerized system for package management, comprising at least one processor; and at least one non transitory storage medium storing instructions that, when executed by the at least one processor, cause the at least one processor to perform steps. The steps comprise storing, in a data structure, information of a seller in association with a plurality of items sold by the seller; receiving an indication of a transaction, the transaction indication including an address of a customer and at least one item identifier corresponding to an item sold by the seller; converting the transaction indication into a shipment request by formatting the transaction indication according to a standardized format required by a shipper; generating a message containing the formatted shipment request; transmitting the message to the shipper in real time to initialize shipment of the item; and providing real time confirmation to the seller and the customer that shipment has been initialized.

Another aspect of the present disclosure is directed to a computer-implemented method for package management, comprising: storing, in a data structure, information of a seller in association with a plurality of items sold by the seller; receiving an indication of a transaction, the transaction indication including an address of a customer and at least one item identifier corresponding to an item sold by the seller; converting the transaction indication into a shipment request by formatting the transaction indication according to a standardized format required by a shipper; generating a message containing the formatted shipment request; transmitting the message to the shipper in real time to initialize shipment of the item; and providing real time confirmation to the seller and the customer that shipment has been initialized.

Yet another aspect of the present disclosure is directed to a computer-implemented method for package management, comprising: storing, in a data structure, information of a seller in association with a plurality of items sold by the seller and seller shipping account information; receiving a request from the customer to determine a shipment cost, the request comprising a destination, delivery time, and planned item; appending seller shipping account information to the request; converting the request to a shipping estimate request by formatting the request according to a standardized format required by the shipper; receiving a shipping estimate in response to the formatted shipping estimate request; reformatting the shipping estimate into a human-readable format; transmitting the shipping estimate to the customer; receiving an indication of a purchase, the purchase indication including an address of a customer and at least one item identifier corresponding to an item sold by the seller; converting the transaction indication into a shipment request by formatting the transaction indication according to a standardized format required by a shipper; generating a message containing the formatted shipment request; transmitting the message to the shipper in real time to initialize shipment of the item; providing real time confirmation to the seller and the customer that shipment has been initialized; and providing tracking information to the seller and the customer in real time.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for efficient grouping of ordered items into packages.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised POD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
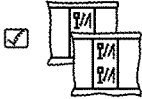
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107O. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
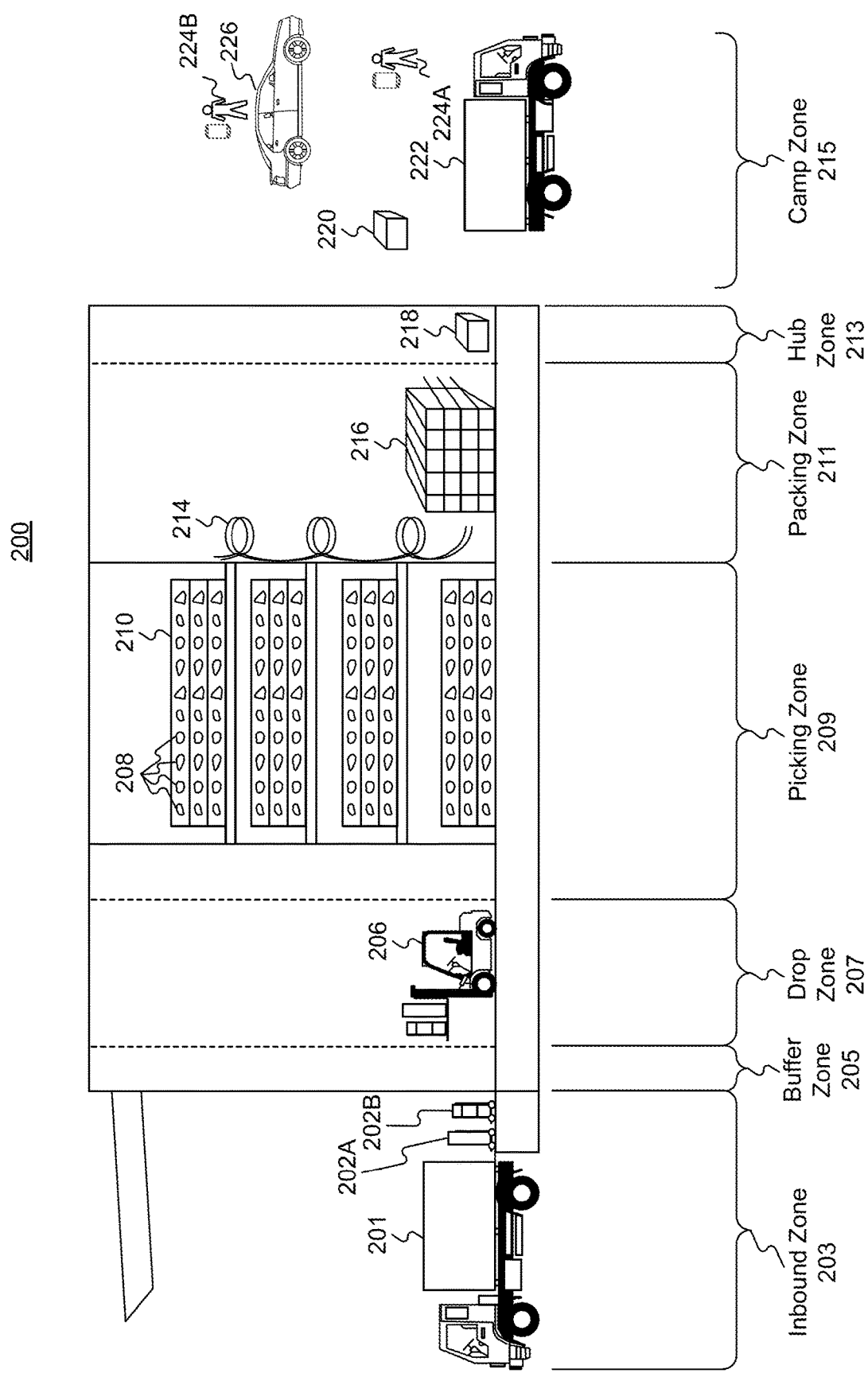
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
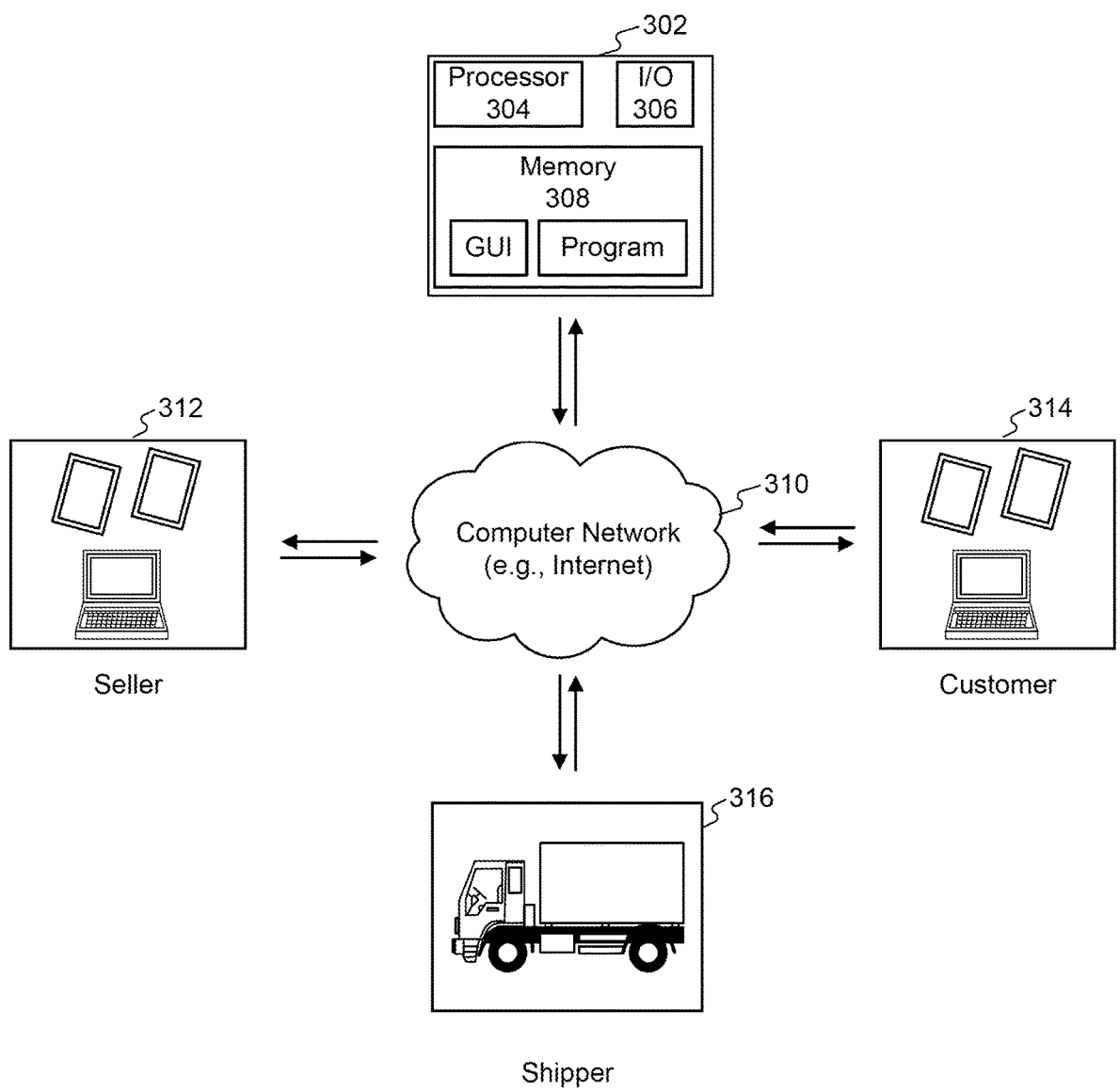
FIG. 3 is a diagrammatic illustration of a package management system and related network, consistent with the disclosed embodiments.

FIG. 3 is a diagrammatic illustration of a package management system 302 and related network, consistent with the disclosed embodiments. System 302 may include at least one processor 304, an input/output (I/O) device that may allow data to be transmitted 306, and at least one memory 308. Memory 308 may store a program for operating the package management methods of the present disclosure. Memory 308 may also store instructions for a graphical user interface (GUI).

Furthermore, processor 304 may be a generic or specific electronic device capable of manipulating or processing information. For example, the processor may include any combination of any number of a central processing unit (CPU), a graphics processing unit (GPU), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, memory 308 may be a generic or specific electronic device capable of storing codes and data accessible by the processor (e.g., via a bus, not shown). For example, memory 308 may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs for specific tasks. Memory 308 may also be a virtual memory that includes one or more memories distributed across multiple machines or devices coupled via a network.

System 302 may be connected to a computer network 310. For example, computer network 310 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

Seller devices 312 may be connected to system 302 via computer network 310. System 302 may host an e-commerce site, control a server (not shown) hosting the e-commerce site, or provide information for display on the e-commerce site. Third party sellers may use seller devices 312 to list goods for sale on the e-commerce site, arrange shipment, accept payments, and communicate with customers using customer devices 314. Additionally, customers may use customer devices 314 to connect to an e-commerce site and find and purchase items listed by third party sellers. Seller devices 312 and customer devices 314 may comprise at least one processor, an input and output device, and at least one memory. For instance, seller devices 312 and customer devices 314 may be laptops, standalone computers, mobile phones, tablet computers, and the like. In some embodiments, system 302 may relay messages between seller devices 312 and customer devices 314. For example, system 302 may host an e-commerce website with a communication portal to allow exchange of messages and other information, such as transactions and shipment details, between sellers and customers. Further, seller devices 312 and customer devices 314 may access shipment data, such as tracking information, stored on a memory of system 302 or on another database (not shown). In some embodiments, system 302 may receive an order from a customer using customer device 314, inform a seller using seller device 312 of the purchase, and transfer money and/or digital goods between the seller and customer to complete a sale or a return and a refund.

Additionally, system 302 may communicate with shipper 316. Shipper 316 may include, for example, a server of a shipping provider that tracks and arranges shipping logistics of packages. System 302 may provide shipper 316 with shipment details, such as a pickup and destination address, item weight and size, and required delivery date via computer network 310. Shipper 316 may then coordinate tasking of delivery personnel and vehicles, or automated delivery devices such as drones, to transfer an item from a seller to a customer.

In some embodiments, system 302 may control information flow between the seller, customer, and shipper. For example, a seller may login to a website hosted by system 302 to list an item. A customer may then purchase the item on the website hosted by system 302. System 302 may inform the seller of the purchase, and send a message to shipper 316 to initialize shipment of the item from the seller to the customer. System 302 may also receive package location updates from shipper 316, and the seller and/or customer may view the tracking updates by accessing a website hosted by system 302. System 302 may similarly process returns of goods from customers to sellers.

Additionally, system 302 may provide information between sellers, customers, and shippers in real time by formatting messages between sellers, customers, and shippers. For example, a shipper may have a format requirement for incoming electronic shipment requests, and may also provide shipment updates in a certain format that is unreadable by customers and sellers. System 302 may therefore provide formatting to messages between a seller, customer, and shipper according to the requirements of each party. Further, system 302 may provide formatting and information relay in real time to ensure all parties have access to shipment data updates quickly.

Figure 4:
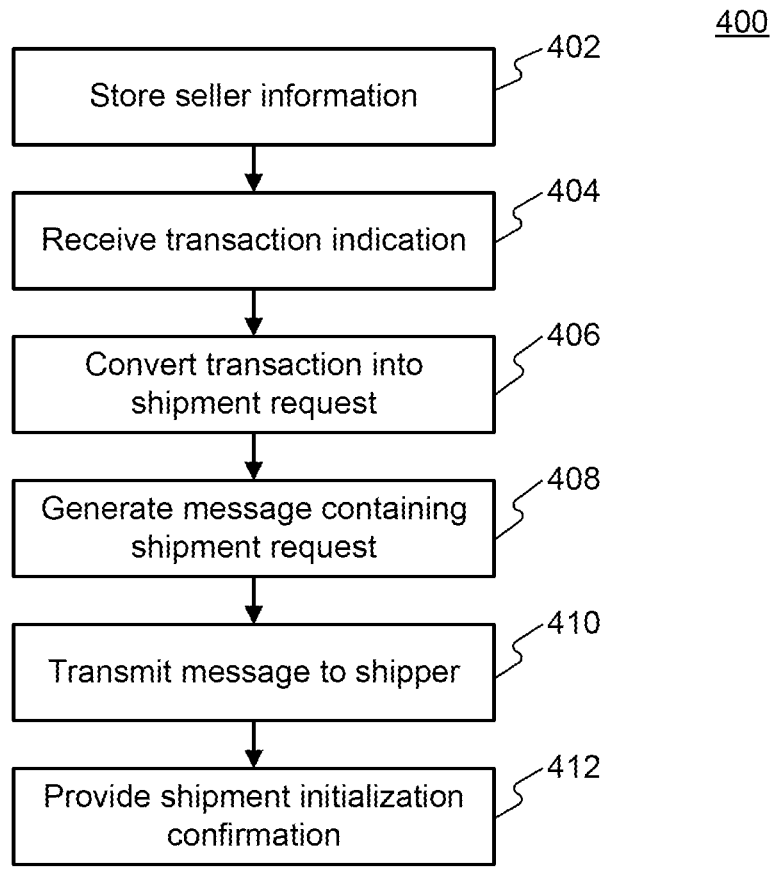
FIG. 4 is a flow chart illustrating an exemplary embodiment of a package management process, consistent with the disclosed embodiments.

FIG. 4 is a flow chart illustrating an exemplary embodiment of a package management process, consistent with the disclosed embodiments. FIG. 4 shows steps of a process 400. System 302 may perform process 400 to provide arrange shipment services on behalf of a third party seller, or, similarly, return shipment from a customer. In step 402, system 302 may store, in a data structure, information of a seller in association with a plurality of items sold by the seller. For example, a seller may use a website of an e-commerce organization to sell items. The seller may provide the e-commerce site with seller information, such as an address for shipment pickup and return, banking information, username, and password. The e-commerce site may assign a seller identifier code to the seller, as well. The data structure may then store the seller information and/or the seller identifier in association with at least one item SKU, price, or other identifier. The data structure may also store sales rules, such as bulk pricing. The data structure may be, for instance, a JSON file or other dictionary having keys comprising seller identifiers, and corresponding values comprising a list of items for sale by the seller. The data structure may also be a SQL table. System 302 may initialize the data structure when a seller creates an account. For example, system 302 may provide an interface allowing a seller to create an online store on an e-commerce site. When the seller creates an account, system 302 may add the seller to the data structure along with items the seller plans to sell on the site.

The seller information may also comprise a record of past transactions, each past transaction including at least one of a customer identifier, item identifier, purchase price, order number, or purchase date. This record may provide verification for a return of an item from a customer, for instance. Thus, in some embodiments, process 400 may include return verification steps. For example, a customer may initiate a return on a website hosted, controlled, or showing information provided by system 302. System 302 may then access the data structure to determine if the customer is recorded as having made a purchase from the seller. Further, the seller information may include a return period (e.g. time period during which a purchased item may be returned) which the seller may indicate when creating an account or listing an item for sale. System 302 may then calculate a difference between a current date, such as the date when the customer initiates the return, and the purchase date corresponding to the item the customer wishes to return. Further, system 302 may transmit a message to the customer in response to both receiving a return request and the difference being greater than the return period, such as a message informing the customer that the item may not be returned. In some embodiments, system 302 may also inform the seller of a failed return attempt, and allow the seller to authorize the return despite the return period elapsing.

At step 404, system 302 may receive an indication of a transaction, the transaction indication including an address of a customer and at least one item identifier corresponding to an item sold by the seller. The transaction indication may include information required to perform a transaction, such as origin and destination addresses for an item, item specifications, origin and destination addresses for payment, and payment amounts. For example, the transaction may occur when a customer completes a purchase of an item corresponding to the seller on an e-commerce website. System 302 may enable the customer to complete the transaction by providing user interfaces and receiving payment. System 302 may also query the data structure to determine seller information corresponding to an item purchased by the seller. Further, system 302 may generate a message to the seller indicating that a customer has purchased one of the seller's items, as well as a message to the customer indicating completion of the purchase. In some embodiments, the message to the seller and the message to the customer may be formatted according to standards set by the seller and customer, respectively. For example, in some scenarios, system 302 may receive transactions, such as high-volume transactions, that are automated, and, as a result, have computer-readable formatting standards for easy ingest into a seller or customer database. Alternatively, the messages may be formatted into a human-readable format, such as an email having HTML code and graphics.

At step 406, system 302 may convert the transaction indication into a shipment request by formatting the transaction indication according to a standardized format required by a shipper. For example, in order to handle high volumes of shipment requests, a shipper may require that shipping request details are provided in a predetermined format, including for example, date, origin, destination, and delivery date. In some scenarios, the shipper may require the information to be arranged in a plurality of fields, such as in a JSON file with keys and values, wherein the keys indicate the meaning of the associated values. By way of another example, the shipper may require the data to be in a particular order, with or without keys, such as a comma separated value text file. As yet another example, the shipper may require formatting of individual data pieces, such as a particular address format (i.e., "street number-street name-zip code" or GPS coordinates) and date format (i.e., MM-DD-YY). The shipper may require information about the package itself, such as size and weight, and may require formatting for this information as well (i.e., in metric or standard units). To format the transaction indication according to a standardized format required by the shipper, system 302 may use regular expressions, for example, to extract sections of data entered by a seller or customer, and populate fields of a format using the extracted sections. System 302 may also perform unit conversions and text manipulation (i.e., character substitutions, removals, and additions). Further, system 302 may execute code to create a template based on information provided by the shipper, and populate the template. For example, system 302 may execute code to perform an automated SQL query and obtain information required to populate the template. For instance, system 302 may query a database to determine a nine digit zip code based on an address and five digit zip code provided by a customer.

At step 408, system 302 may generate a message containing the formatted shipment request. The message may include, for instance, a destination IP address, mail server, or other routing instructions required to reach a shipper's server. At step 410, system 302 may transmit the message to the shipper in real time to initialize shipment of the item. For example, a shipper may initialize a shipment upon receipt of the message by entering the shipment into the shipper's database, scheduling pickup, and issuing a tracking number. Thus, by formatting the shipment request prior to transmission to the shipper, system 302 may provide for real time shipment initialization, rather than traditional methods whereby a third party seller may initialize shipment separate from the transaction receipt. For example, real time may mean occurring as soon as possible, given computational processing time, after a preceding step is completed, such as receiving an indication of a transaction, or receiving authorization of a transaction. In some embodiments, transmitting the message to the shipper in real time may be performed using an Application Programming Interface (API). API use may further decrease computational processing time, and enable real time transmission of shipment requests.

At step 412, system 302 may provide real time confirmation to the seller and the customer that shipment has been initialized. System 302 may, for instance, update a seller portal on a website allowing the seller to see shipment status on demand, and provide a similar customer portal for the customer. Alternatively or additionally, system 302 may provide a message to the seller and/or the customer confirming that the shipment has been initialized, such as an email or text message. System 302 may receive a confirmation from the shipper prior to sending confirmation to the seller and the customer at step 412.

In some embodiments, system 302 may provide real time tracking information to the seller and the customer. Real time tracking may provide increased confidence in the security of the purchase for the customer, as well as protections for the seller, thereby reducing transaction risk and increasing sales volume for third party sellers using an e-commerce site. For example, system 302 may receive tracking information from the shipper by, for instance, generating a message containing a formatted update request. The formatted update request may be in a format specified by the shipper and generated in response to receiving an update request from one of the seller or customer, for instance by using a similar formatting process as described for step 406. System 302 may also reformat the tracking information into a human-readable format, such as by adding context to describe the meaning of the tracking information. For instance, system 302 may receive a string of text comprising a tracking number, coded location, and UTC time. System 302 may reformat this information by segmenting the string, decoding the location (i.e., from an airport code to a city name), and converting the time to a local time zone. Further, system 302 may provide the reformatted tracking information to at least one of the seller or customer in real time in response to receiving an update request. System 302 may also periodically query the shipper and store shipment information, or may receive reports from the shipper without transmitting a request. Further, the data structure may store shipment identifiers, and system 302 may access the data structure to obtain shipment identifiers associated with the seller.

To illustrate, a seller may log on to a seller portal of an e-commerce site, and click on a link to view shipment status of packages the seller has shipped in response to purchases from customers. The seller's click to view shipment statuses may cause system 302 to generate a message, such as an API request, comprising shipment identifiers, and submit the request to the shipper. The shipper may respond with locations for the packages in the message using an API, and system 302 may extract information from the response and format it for display on the seller portal.

The real time communication methods according to the present disclosure may help provide customers with live shipping estimates so that customers may shop third party sellers without being surprised by shipping costs. For instance, system 302 may receive a request from the customer to determine a shipment cost, the request comprising a destination, delivery time, and planned item. System 302 may also generate the request as the customer shops on an e-commerce site, such as when the customer scrolls through listings of items, based on items displayed on a page and stored customer information.

Further, system 302 may append seller shipping account information to the request from the customer to determine the shipping cost. For example, items on a page may be correlated in the data structure to a seller, and/or to a seller shipping account, and system 302 may search the data structure to obtain the shipping account information. The presence of shipping account information may indicate, for instance, that the seller plans to use the shipper to ship the item to the customer if the customer purchases the item. In some embodiments, the shipping account information may be correlated in a shipper database to the seller's location and banking information, as well as any discounts available to the seller.

System 302 may also convert the request to a shipping estimate request, the shipping estimate request being created by formatting the request according to the standardized format required by the shipper. The request may include an indication that it is for estimate purposes, rather than to initialize a shipment. System 302 may then receive a shipping estimate from the shipper, and reformat the shipping estimate to a human-readable format for transmitting to the customer. This may be done in real time, in order to display shipping costs from a third party seller to the customer while the customer is shopping on an e-commerce site.

In some embodiments, the formatted shipment request of step 408 may be used to initialize shipment of the item from the seller to the customer. Alternatively, the formatted shipment request may be used to initialize shipment of the item from the customer to the seller. For example, the transaction indication may correspond to an item return, as described above, and the shipment of the item may comprise shipping the item from the customer to the seller. In traditional systems, returning an item to third party sellers may be cumbersome for sellers who may be forced to arrange shipment independently, for instance, by requiring multiple payments, such as one to a shipping company and one to the e-commerce site or to the customer. However, process 400 may enable easier returns to third party sellers by providing shipping costs in real time, allowing sellers to process returns quicker and with less difficulty.

For example, system 302 may receive a shipment cost from the shipper, based on a transaction indication corresponding to an item return. System 302 may receive a refund amount and the shipment cost from the seller, for instance, by an automatic withdrawal from a seller's bank account. System 302 may also transfer the refund amount to the customer, and transfer the shipment cost to the shipper. Thus, by formatting messages according to shipper requirements in real time, system 302 according to the present disclosure may enable quicker return processing.

Figure 5:
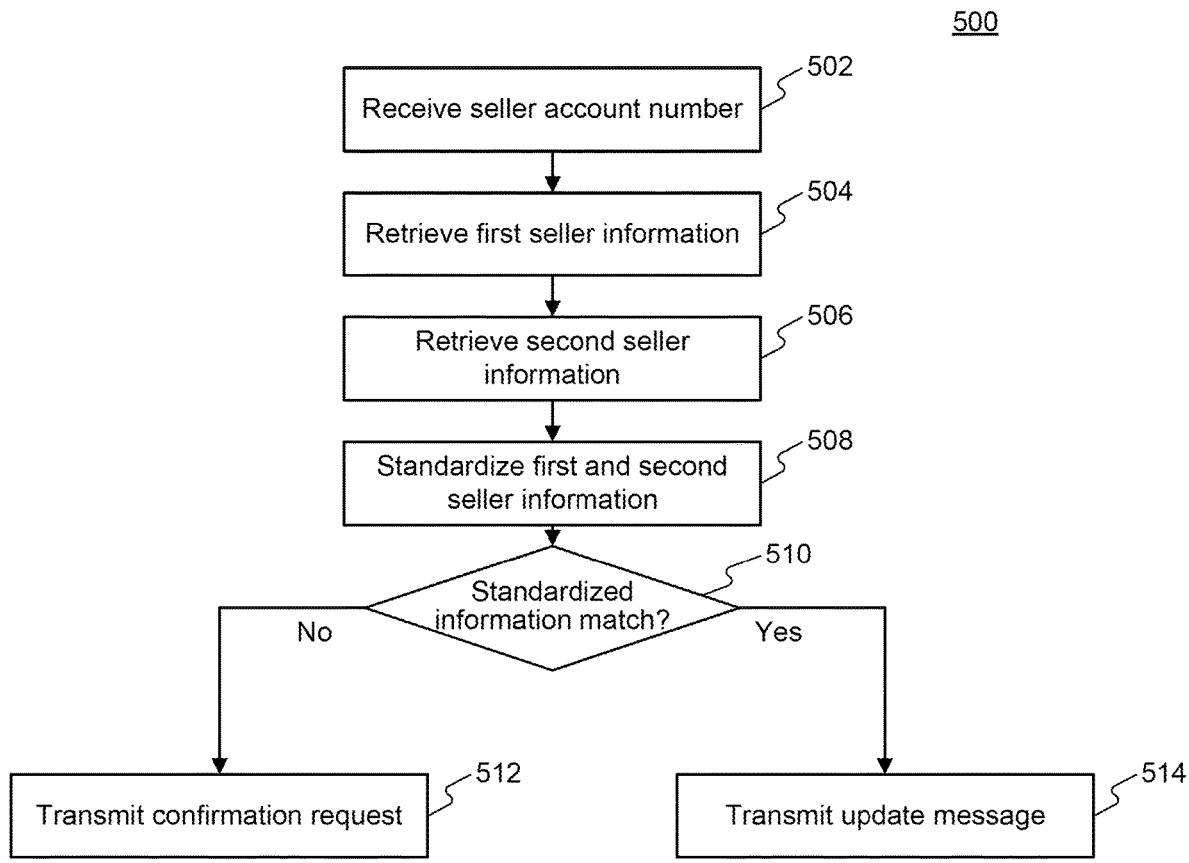
FIG. 5 is a flow chart illustrating an exemplary embodiment of a seller information deconfliction process, consistent with the disclosed embodiments.

In some cases, a seller may establish an account with the shipper independent of an e-commerce site, but may still wish to use reduced shipping rates obtained by the e-commerce site from the shipper. However, the seller may provide information to the shipper that differs from information the seller provides to the e-commerce site, such as information having differing formats or data. Further, these differing formats may prevent the e-commerce site from communicating with the shipper to obtain shipping costs or initialize a new shipment. Therefore, in some embodiments, system 302 may provide a seller information deconfliction process. Accordingly, FIG. 5 is a flow chart illustrating an exemplary embodiment of a seller information deconfliction process 500, consistent with the disclosed embodiments.

At step 502, system 302 may receive a seller account number corresponding to the seller and the shipper. The seller may obtain a seller account number by creating an account with the shipper, and may provide the seller account number to the e-commerce site when initializing an account with the e-commerce site, for instance. The e-commerce site may then link the seller's e-commerce account and the seller's shipping account, such as by correlating account identifiers in the data structure.

At step 504, system 302 may retrieve first seller information from the shipper. Step 504 may include, for example, generating an API request in a format specified by the shipper and including the seller account information. The API request may be sent to the shipper, and the shipper may provide the shipper's record of the seller's information to system 302 in response. System 302 may also, at step 506, retrieve second seller information from the data structure. The first seller information and the second seller information may contain similar categories of information, but in different formats. For example, the first seller information and the second seller information may comprise at least one of a seller address and seller bank account.

At step 508, system 302 may convert the first seller information and the second seller information to a standardized seller information format. The seller information format may be the same as a format used to communicate with the shipper in process 400, for example. System 302 may use regular expressions to identify values corresponding to categories in the first seller information and second information, and extract segments from the first seller information and second seller information. System 302 may also replace characters, such as non-alphanumeric characters, or white space, or may introduce extra characters, for instance at standard locations. For example, a standardized bank account may be a string of 5 digits, followed by a dash, and 10 more digits. Using a regular expression, system 302 may identify a string of 15 digits in sequence in the first seller information, and standardize the string of 15 digits by inserting a dash after the fifth digit. System 302 may use other algorithms or expressions to standardize the first seller information and the second seller information according to the seller information format, including automated SQL queries, scripts, and language translation.

At step 510, system 302 may compare the converted first seller information with the converted second seller information. If the converted first seller information and the converted second seller information do not match, step 510 is NO, and system 302 may proceed to step 512 to transmit a confirmation request to the seller. Conversely, if the converted first seller information and the converted second seller information do match, step 510 is YES, and system 302 may proceed to step 514 to transmit an update message to the shipper to cause the shipper to update the seller account with converted seller information.

In other words, two pieces of data comprising the same information but in different formats should have the same result when analyzed by the same standardization steps. If the results differ, the pieces of data may not comprise the same information. In the present example of seller information in an e-commerce data structure and a shipper data structure, differing results may indicate that the seller provided different information to the shipper and the e-commerce site, and therefore, system 302 may ask the seller to confirm the information, and may further cause the shipper to update the seller's information with information provided by the seller in response to the confirmation request. On the other hand, if the results after standardization are the same, but the two pieces of data are not identical, the difference may be trivial or stem from a formatting difference. In the present example of seller information in an e-commerce data structure and a shipper data structure, system 302 may update the shipper with the converted seller information or update the e-commerce data structure, thereby ensuring consistency across databases.

As an exemplary embodiment of the present disclosure, a computer-implemented method for package management may include a plurality of steps. The steps may include storing, in a data structure, information of a seller in association with a plurality of items sold by the seller and seller shipping account information; receiving a request from the customer to determine a shipment cost, the request comprising a destination, delivery time, and planned item; appending seller shipping account information to the request; and converting the request to a shipping estimate request by formatting the request according to a standardized format required by the shipper. The computer-implemented method may also include receiving a shipping estimate in response to the formatted shipping estimate request; reformatting the shipping estimate into a human-readable format; transmitting the shipping estimate to the customer; receiving an indication of a purchase, the purchase indication including an address of a customer and at least one item identifier corresponding to an item sold by the seller; and converting the transaction indication into a shipment request by formatting the transaction indication according to a standardized format required by a shipper. Further, the computer-implemented method may also include generating a message containing the formatted shipment request; transmitting the message to the shipper in real time to initialize shipment of the item; providing real time confirmation to the seller and the customer that shipment has been initialized; and providing tracking information to the seller and the customer in real time.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, in some embodiments, steps may be substituted, replaced, added, or reordered in processes without deviating from the present disclosure. Further, in some embodiments, some steps may occur simultaneously. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for package management, comprising:
    at least one processor; and
    at least one non transitory storage medium storing instructions that, when executed by the at least one processor, cause the at least one processor to perform steps comprising:
        storing, in a first data structure, information of a seller in association with a plurality of items sold by the seller via a seller device;
        receiving an indication of a transaction, the transaction indication including an address of a customer and at least one item identifier corresponding to an item sold by the seller;

converting the transaction indication into a shipment request by formatting the transaction indication according to a standardized format required by a shipper server, wherein the standardized format is a machine-readable format, wherein formatting the transaction indication further comprises:
    extracting sections of data provided by the seller device or a customer device associated with the customer using at least one regular expression; and
    populating fields of the standardized format using the extracted sections;
generating a message containing the formatted shipment request;
transmitting the message to the shipper server in real time to initialize shipment of the item;
transforming non-standardized information received from the shipper server into a real time standardized confirmation that the shipment has been initialized;
providing the real time standardized confirmation to the seller device and the customer device by updating a website so the seller device and the customer device have real time access to up-to-date shipment information;
receiving a status request from one of the seller device or the customer device in a first computer protocol;
converting the received status request into a second computer protocol;
transmitting the converted status request to the shipper server;
in response to transmitting the converted status request, receiving status information from the shipper server in the second computer protocol;
converting the received status information into the first computer protocol;
dynamically formatting the received status information for display on one of the seller device or the customer device from which the status request was received;
receiving a seller account number corresponding to the seller and the shipper;
retrieving first seller information of the seller from a second data structure associated with the shipper server, wherein the first seller information is based on the seller account number;
retrieving, from the first data structure, second seller information of the seller, wherein the second seller information is based on the seller account number, wherein the second seller information is different from the first seller information;
transforming each of the first seller information and the second seller information to a standardized seller information format, comprising:
    identifying one or more values corresponding to one or more categories in the seller information using at least one of regular expressions, automated SQL queries, scripts, or language translation;
    extracting segments from the seller information based on the identified values; and
    populating fields of the standardized seller information format based on the extracted segments;
determining whether transformed first seller information matches transformed second seller information;
in response to the transformed first seller information not matching the transformed second seller information,
    transmitting a confirmation request to the seller device, and
    updating at least one of the first data structure or the second data structure based on a response to the confirmation request; and
in response to the transformed first seller information matching the transformed second seller information, transmitting an update request to the shipper server, wherein the update request includes an update to the second data structure containing the first seller information.

2. The system of claim 1, wherein the transaction indication corresponds to an item return, and the shipment of the item comprises shipping the item from the customer to the seller.

3. The system of claim 2, wherein the steps further comprise:
    receiving a shipment cost from the shipper server;
    receiving a refund amount and the shipment cost from the seller device;
    transferring the refund amount to the customer device; and
    transferring the shipment cost to the shipper server.

4. The system of claim 1, wherein the seller information further comprises a record of past transactions, each past transaction including at least one of a customer identifier, item identifier, purchase price, order number, or purchase date.

5. The system of claim 4, wherein the seller information comprises a return period and purchase date, and the steps further comprise:
    calculating a difference between a current date and the purchase date; and
    transmitting a message to the customer device in response to both receiving a return request and the difference being greater than the return period.

6. The system of claim 1, wherein the first seller information and the second seller information comprise at least one of a seller address and seller bank account.

7. The system of claim 1, wherein transmitting the message to the shipper server in real time is performed using an API.

8. The system of claim 1, wherein the steps further comprise:
    receiving a request from the customer device to determine a shipment cost, the request comprising a destination, delivery time, and planned item;
    appending seller shipping account information to the request;
    converting the request to a shipping estimate request, the shipping estimate request being created by formatting the request according to the standardized format required by the shipper server;
    receiving a shipping estimate;
    reformatting the shipping estimate into a human-readable format; and
    transmitting the shipping estimate to the customer device.

9. A computer-implemented method for package management, comprising:
    storing, in a first data structure, information of a seller in association with a plurality of items sold by the seller via a seller device;
    receiving an indication of a transaction, the transaction indication including an address of a customer and at least one item identifier corresponding to an item sold by the seller;

converting the transaction indication into a shipment request by formatting the transaction indication according to a standardized format required by a shipper server, wherein the standardized format is a machine-readable format, wherein formatting the transaction indication further comprises:
  extracting sections of data provided by the seller or a customer device associated with the customer using at least one regular expression; and
  populating fields of the standardized format using the extracted sections;
generating a message containing the formatted shipment request;
transmitting the message to the shipper server in real time to initialize shipment of the item;
transforming non-standardized information received from the shipper server into a real time standardized confirmation that the shipment has been initialized;
providing the real time standardized confirmation to the seller device and the customer device by updating one or more portals on a website so the seller device and the customer device have real time access to up-to-date shipment information;
receiving a status request from one of the seller device or the customer device in a first computer protocol;
converting the received status request into a second computer protocol;
transmitting the converted status request to the shipper server;
in response to transmitting the converted status request, receiving status information from the shipper server in the second computer protocol;
converting the received status information into the first computer protocol;
dynamically formatting the received status information for display on one of the seller device or the customer device from which the status request was received;
receiving a seller account number corresponding to the seller and the shipper;
retrieving first seller information of the seller from a second data structure associated with the shipper server, wherein the first seller information is based on the seller account number;
retrieving, from the first data structure, second seller information of the seller, wherein the second seller information is based on the seller account number, wherein the second seller information is different from the first seller information;
transforming each of the first seller information and the second seller information to a standardized seller information format, comprising:
  identifying one or more values corresponding to one or more categories in the seller information using at least one of regular expressions, automated SQL queries, scripts, or language translation;
  extracting segments from the seller information based on the identified values; and
  populating fields of the standardized seller information format based on the extracted segments;
determining whether transformed first seller information matches transformed second seller information;
in response to the transformed first seller information not matching the transformed second seller information, transmitting a confirmation request to the seller device, and
  updating at least one of the first data structure or the second data structure based on a response to the confirmation request; and
in response to the transformed first seller information matching the transformed second seller information, transmitting an update request to the shipper server, wherein the update request includes an update to the second data structure containing the first seller information.

10. The computer-implemented method of claim 9, wherein the transaction indication corresponds to an item return, and the shipment of the item comprises shipping the item from the customer to the seller.

11. The computer-implemented method of claim 10, wherein the steps further comprise:
  receiving a shipment cost from the shipper server;
  receiving a refund amount and the shipment cost from the seller device;
  transferring the refund amount to the customer device; and
  transferring the shipment cost to the shipper server.

12. The computer-implemented method of claim 9, wherein the seller information further comprises a record of past transactions, each past transaction including at least one of a customer identifier, item identifier, purchase price, order number, or purchase date.

13. The computer-implemented method of claim 12, wherein the seller information comprises a return period and purchase date, and the steps further comprise:
  calculating a difference between a current date and the purchase date; and
  transmitting a message to the customer device in response to both receiving a return request and the difference being greater than the return period.

14. The computer-implemented method of claim 9, wherein the first seller information and the second seller information comprise at least one of a seller address and seller bank account.

15. The computer-implemented method of claim 9, wherein transmitting the message to the shipper server in real time is performed using an API.

16. A computer-implemented method for package management, comprising:
  storing, in a first data structure, information of a seller in association with a plurality of items sold by the seller and seller shipping account information;
  receiving a request from a customer device to determine a shipment cost, the request comprising a destination, delivery time, and planned item;
  appending seller shipping account information to the request;
  converting the request to a shipping estimate request by formatting the request according to a standardized format required by the shipper server, wherein the standardized format is a machine-readable format, wherein formatting the transaction indication further comprises:
    extracting sections of data provided by the seller device or the customer device using at least one regular expression; and
    populating fields of the standardized format using the extracted sections;
  receiving a shipping estimate in response to the formatted shipping estimate request;
  reformatting the shipping estimate into a human-readable format;
  transmitting the shipping estimate to the customer device;

receiving an indication of a purchase, the purchase indication including an address of a customer and at least one item identifier corresponding to an item sold by the seller;

converting the transaction indication into a shipment request by formatting the transaction indication according to a standardized format required by a shipper server, wherein the standardized format is a machine-readable format;

generating a message containing the formatted shipment request;

transmitting the message to the shipper server in real time to initialize shipment of the item;

transforming non-standardized information received from the shipper server into a real time standardized confirmation that the shipment has been initialized;

providing the real time standardized confirmation to the seller device and the customer device by updating one or more portals on a website so the seller device and the customer device have real time access to up-to-date shipment information;

receiving a status request from one of the seller device or the customer device in a first computer protocol;

converting the received status request into a second computer protocol;

transmitting the converted status request to the shipper server;

in response to transmitting the converted status request, receiving status information from the shipper server in the second computer protocol;

converting the received status information into the first computer protocol;

dynamically formatting the received status information for display on one of the seller device or the customer device from which the status request was received;

receiving a seller account number corresponding to the seller and the shipper;

retrieving first seller information of the seller from a second data structure associated with the shipper server, wherein the first seller information is based on the seller account number;

retrieving, from the first data structure, second seller information of the seller, wherein the second seller information is based on the seller account number, wherein the second seller information is different from the first seller information;

transforming each of the first seller information and the second seller information to a standardized seller information format, comprising:
  identifying one or more values corresponding to one or more categories in the seller information using at least one of regular expressions, automated SQL queries, scripts, or language translation;
  extracting segments from the seller information based on the identified values; and
  populating fields of the standardized seller information format based on the extracted segments;

determining whether transformed first seller information matches transformed second seller information;

in response to the transformed first seller information not matching the transformed second seller information,
  transmitting a confirmation request to the seller device, and
  updating at least one of the first data structure or the second data structure based on a response to the confirmation request; and in response to the transformed first seller information matching the transformed second seller information, transmitting an update message to the shipper server, wherein the update message includes an update to the second data structure containing the first seller information.

* * * * *